United States Patent
Jones et al.

(10) Patent No.: US 7,945,803 B2
(45) Date of Patent: May 17, 2011

(54) CLOCK GENERATION FOR MULTIPLE CLOCK DOMAINS

(75) Inventors: Anthony Mark Jones, Beaverton, OR (US); Kevin M. Koschoreck, Beaverton, OR (US)

(73) Assignee: Nethra Imaging, Inc., Santa Clara, CA (US)

( * ) Notice: Subject to any disclaimer, the term of this patent is extended or adjusted under 35 U.S.C. 154(b) by 1042 days.

(21) Appl. No.: 11/460,231

(22) Filed: Jul. 26, 2006

(65) Prior Publication Data
US 2007/0064852 A1    Mar. 22, 2007

Related U.S. Application Data

(63) Continuation-in-part of application No. 10/871,347, filed on Jun. 18, 2004, now Pat. No. 7,206,870.

(60) Provisional application No. 60/702,727, filed on Jul. 26, 2005, provisional application No. 60/479,759, filed on Jun. 18, 2003.

(51) Int. Cl.
*G06F 1/04*    (2006.01)
(52) U.S. Cl. .................. 713/501; 713/500; 713/502
(58) Field of Classification Search ............ 713/500, 713/501, 502, 503
See application file for complete search history.

(56) References Cited

U.S. PATENT DOCUMENTS

| 5,345,109 | A | 9/1994 | Mehta |
| 5,634,117 | A | 5/1997 | Conary et al. |
| 6,345,328 | B1 * | 2/2002 | Rozario et al. ............. 710/52 |
| 6,424,688 | B1 * | 7/2002 | Tan et al. ................. 375/354 |
| 6,667,638 | B1 * | 12/2003 | Kramer et al. ............ 327/115 |
| 2005/0229066 | A1 * | 10/2005 | Wolff et al. .............. 714/744 |
| 2005/0262374 | A1 * | 11/2005 | Shinkawa ................ 713/500 |
| 2006/0064616 | A1 * | 3/2006 | Rajski et al. ............. 714/726 |

FOREIGN PATENT DOCUMENTS
EP    0 547 768 A2    6/1993
* cited by examiner

*Primary Examiner* — Thomas Lee
*Assistant Examiner* — Paul B Yanchus, III
(74) *Attorney, Agent, or Firm* — Marger Johnson & McCollom PC

(57) ABSTRACT

This disclosure relates to generating clock signals that drive data passing circuitry for various clock domains. Each individual clock domain can adjust its operating frequency from one generated by a central clock to an appropriate frequency. By using embodiments of the invention, clock crossing circuitry between domains need not run at the highest clock frequency of the entire circuit, but rather the clock crossing circuitry need only operate at the highest frequency of the two domains sharing data.

10 Claims, 17 Drawing Sheets

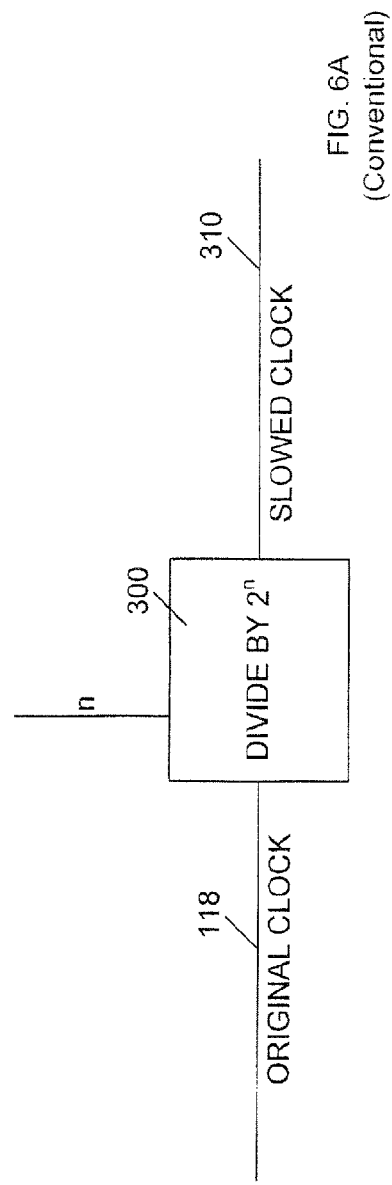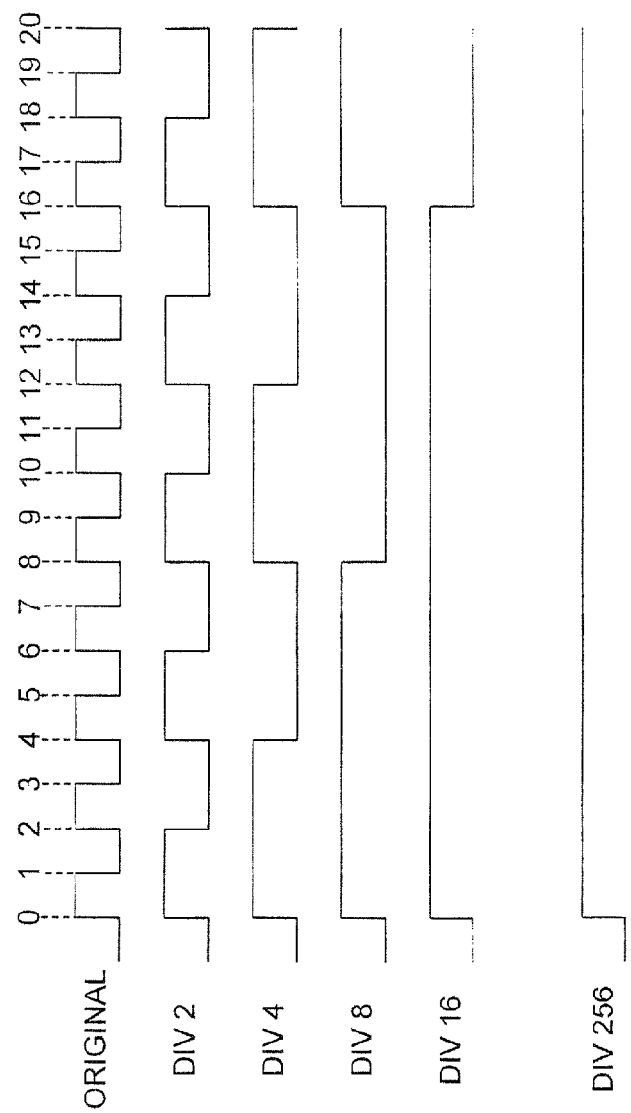
FIG. 6A (Conventional)
FIG. 6B (Conventional)

CLOCK GENERATION FOR MULTIPLE CLOCK DOMAINS

RELATED APPLICATIONS

This disclosure claims priority from and is a Continuation-In-Part to currently pending U.S. patent application Ser. No. 10/871,347, filed Jun. 18, 2004, entitled Data Interface for Hardware Objects, which in turn claims priority from U.S. Provisional 60/479,759, filed Jun. 18, 2003, entitled Integrated Circuit Development System. This disclosure also claims priority from U.S. provisional patent application 60/702,727, filed Jul. 26, 2005, entitled System for Generating Multiple Clock Frequencies for Multiple Clock Domains and For Sharing Data Across Those Domains. All of the above-referenced applications are incorporated by reference herein.

TECHNICAL FIELD

This disclosure relates to exchanging data across different clock domains in a circuit, and, more particularly, to a system that can drive multiple clock domains at different frequencies and allows for data exchange between such domains.

BACKGROUND

Many integrated circuits increase performance and decrease power requirements by tapping a single, high-speed, synchronous clock into multiple clock domains. In such systems, one or more domains may run at different clock speeds. In the most advanced systems, each individual clock domain is powered by a separate timing clock that can run at a speed independent of all the other timing clocks in the integrated circuit.

An example multiple clock domain integrated circuit 20 is illustrated in FIG. 1. In FIG. 1, the integrated circuit 20 is divided into two clock domains 22 and 26. A clock crossing circuit 24 connects the two domains 22, 26 and manages transferring data between the two domains. Although theoretically an integrated circuit can be divided into any number of separate clock domains, the additional design overhead generally makes having too many domains impractical. With reference to FIG. 1, the clock domain 22 gets its clock signal from a Phase Locked Loop (PLL) 32, while clock domain 26 gets its clock signal from a PLL 36. Each of the PLLs 32, 36 receive a common clock signal 30 from a common reference clock source (not shown) and generates its own clock signal.

There are several problems with this prior art approach. First, even if the PLLs 32, 36 are set to the same frequency, the clock signals driving the clock domains 22 and 26 will not be aligned at the clock edges since the clock reference 30 travels through different paths to the different PLLs 32, 36. To accommodate for this, a skew adjust circuit 34 may be inserted between the PLLs 32, 36. The skew adjust circuit 34 can be adjusted to change the timing of the PLL 36 so that it matches the timing of PLL 32. In this way, the skew adjust circuit 34 can be operated such that the clock domain 22 and clock domain 26 effectively receive their respective clock signals at exactly the same time, regardless of the path the clock signal 30 may take between different PLLs.

In more complex systems where the clock domains 22, 26 operate at different clock frequencies, additional problems arise. One such problem is clock edge misalignment. For instance, if clock domain 22 operates at 4 MHz while clock domain 26 operates at 5 MHz, very few clock edges of both circuits occur simultaneously. With reference to FIG. 2, the two illustrated clock signals only share the same rising edge once per microsecond and their falling edges never align. ID some circuits data can only be transferred at a rising edge of a clock and such data sharing circuits must include large data buffers between them to accommodate for the clock frequency mismatch. This length of the depth/size of the necessary data buffers scales as the operating frequencies between the domains diverge.

In the case of true asynchrony, meta-stable conditions can occur. Metastability issues can never be completely removed, but the probability of failure can be reduced by including extra time to resolve the timing issues. This significantly lowers the maximum transfer rate between clock domains having different clock frequencies.

Embodiments of the invention address these and other limitations in the prior art.

BRIEF DESCRIPTION OF THE DRAWINGS

FIGS. 6A and 6B are related block and timing diagrams illustrating an example programmable clock divider used in embodiments of the invention.

DETAILED DESCRIPTION

Figure 1:
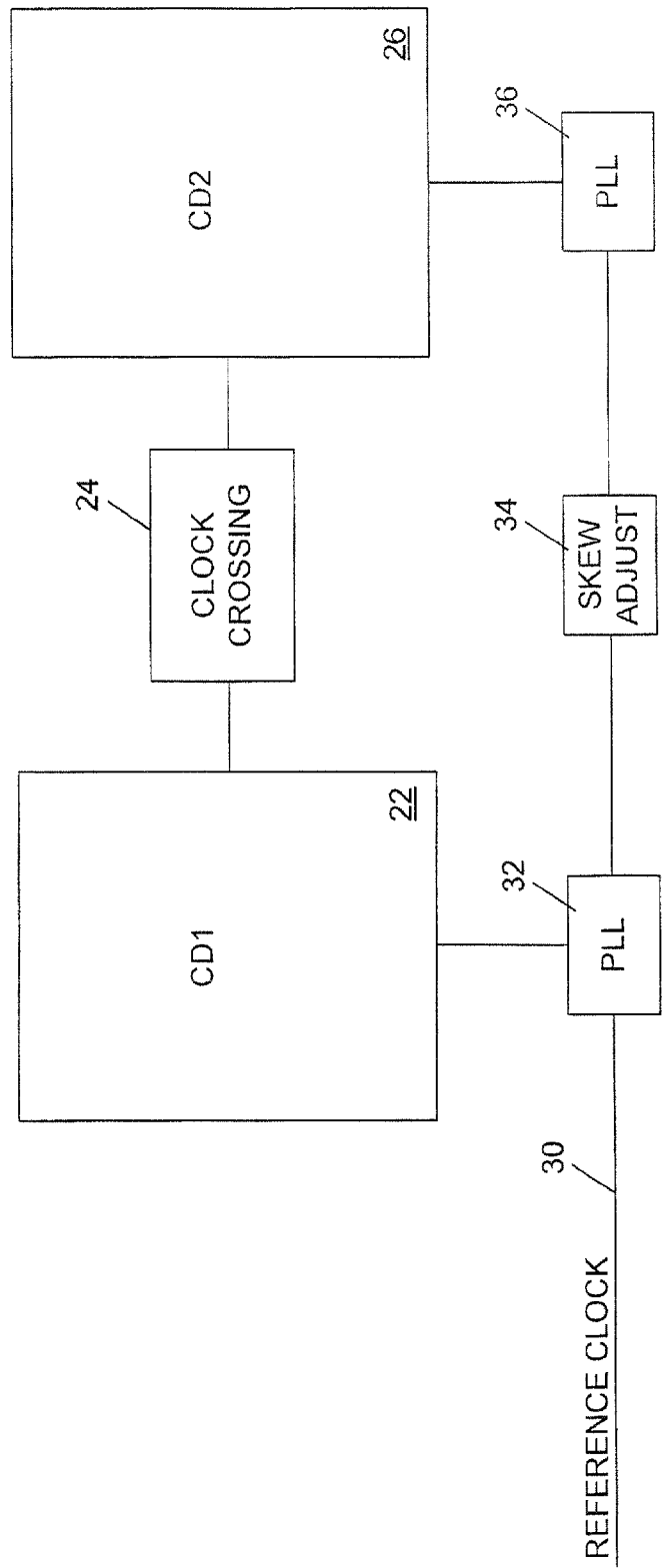
FIG. 1 is a block diagram of an integrated circuit including multiple clock domains in a system according to the prior art.
Figure 2:
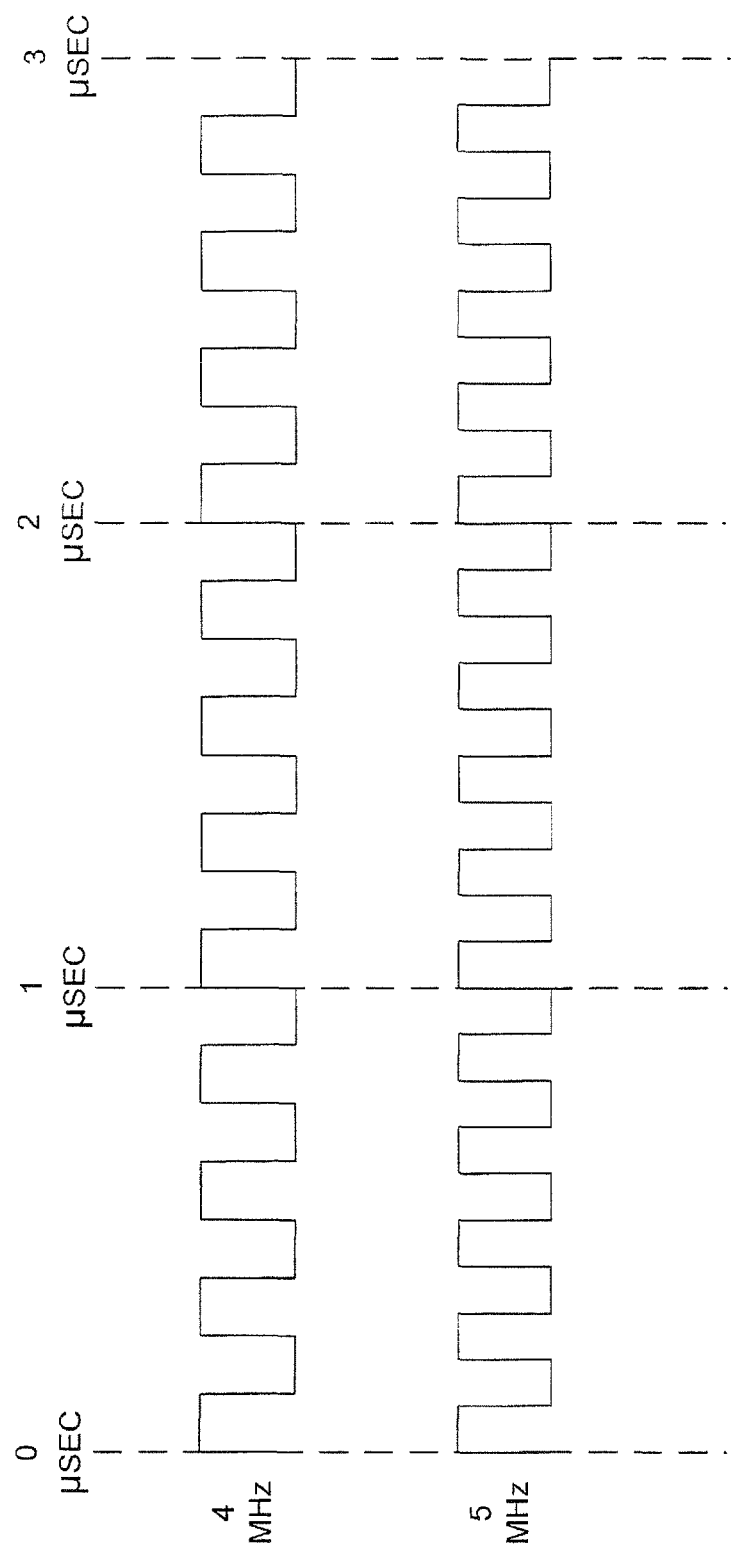
FIG. 2 is a timing diagram illustrating conventional timing clocks for different example clock domains.
Figure 3:
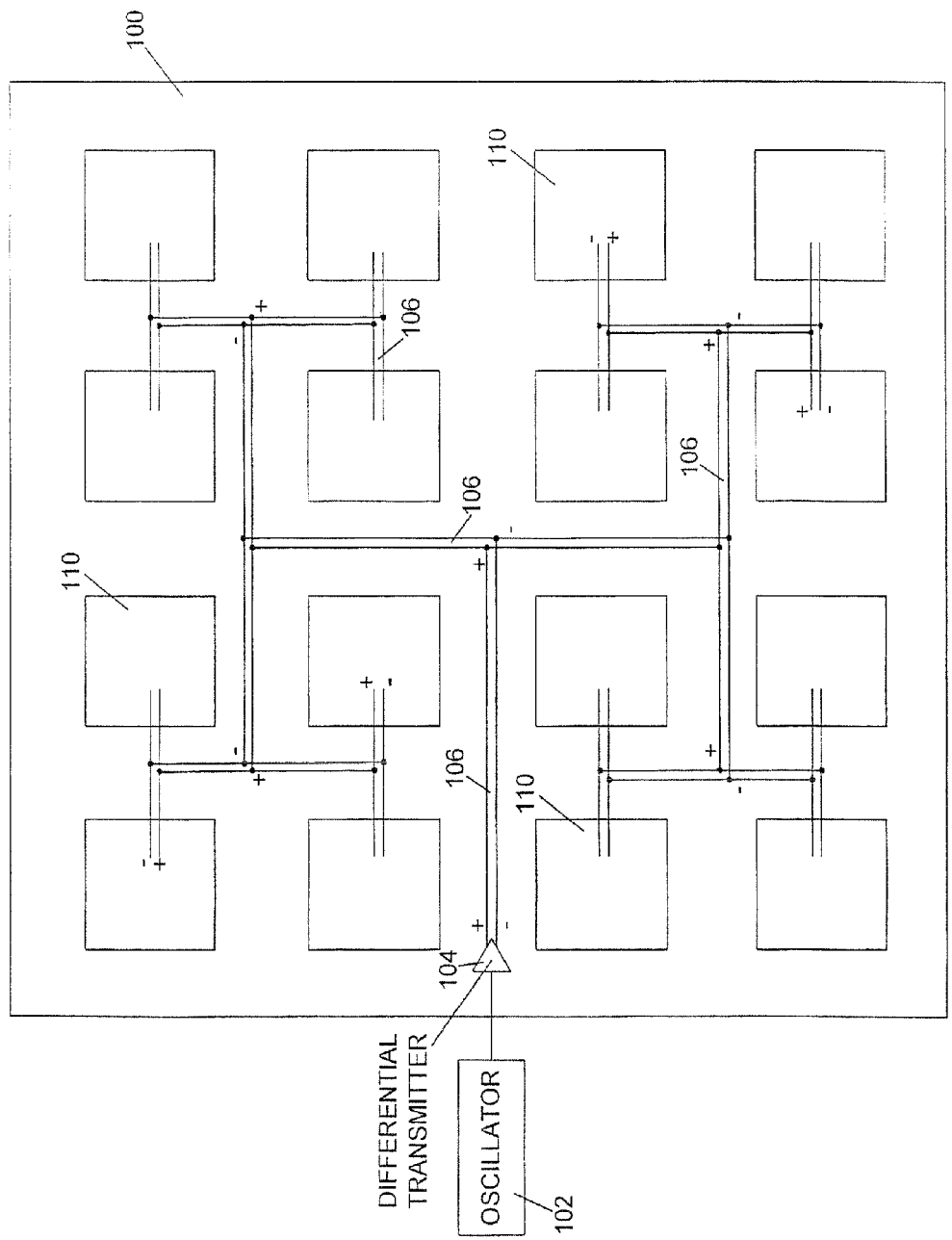
FIG. 3 is a block diagram illustrating clock distribution in a portion of a system according to embodiments of the invention.

FIG. 3 is a block diagram of an example integrated circuit according to embodiments of the invention. In FIG. 3, an integrated circuit 100 is formed of multiple blocks 110.

Although sixteen blocks 110 are illustrated in this figure, embodiments of the invention may include any number of blocks. An oscillator, such as an oscillating crystal 102 or some other clock source is typically separate from the integrated circuit 100. In some embodiments the clock source can be provided to the integrated circuit 100 through an input pin. The clock signal from the input pin or oscillator 102 is connected to a differential transmitter 104, which is connected through a set of differential clock signal lines 106 to blocks 110 throughout the circuit 100. The differential transmitter 104 accepts the oscillator 102 signal and generates two outputs, one positive and one negative, which can be sensed by a receiver (not shown) in the blocks 110 to re-create the original input clock signal. Discussion of such clock generation follows. Distributing a relatively low frequency clock through a differential system minimizes clock skew and provides other benefits to the integrated circuit 100. Some embodiments of the invention do not use a differential transmitter 104 at all, and instead route the clock signal from the oscillator 102 (or from an intermediate transmitter) directly to each of the blocks 110. Also, although the clock signal lines are illustrated in FIG. 3 as being in an "H" tree configuration, there are multiple other ways to distribute clock signals within an integrated circuit that also minimize routing signal differences, such as spanning trees and crosses as is known in the art. In some embodiments, the clock lines 106 do not travel through any data buffers, but rather are routed throughout the integrated circuit 100 as a pair of conductive lines. Using a relatively low frequency clock and using a routing system that includes differential pairs of routing wires allows such a system to be implemented without incurring the significant skew the data buffers give. Of course, such design choices are implementation specific.

Figure 4:
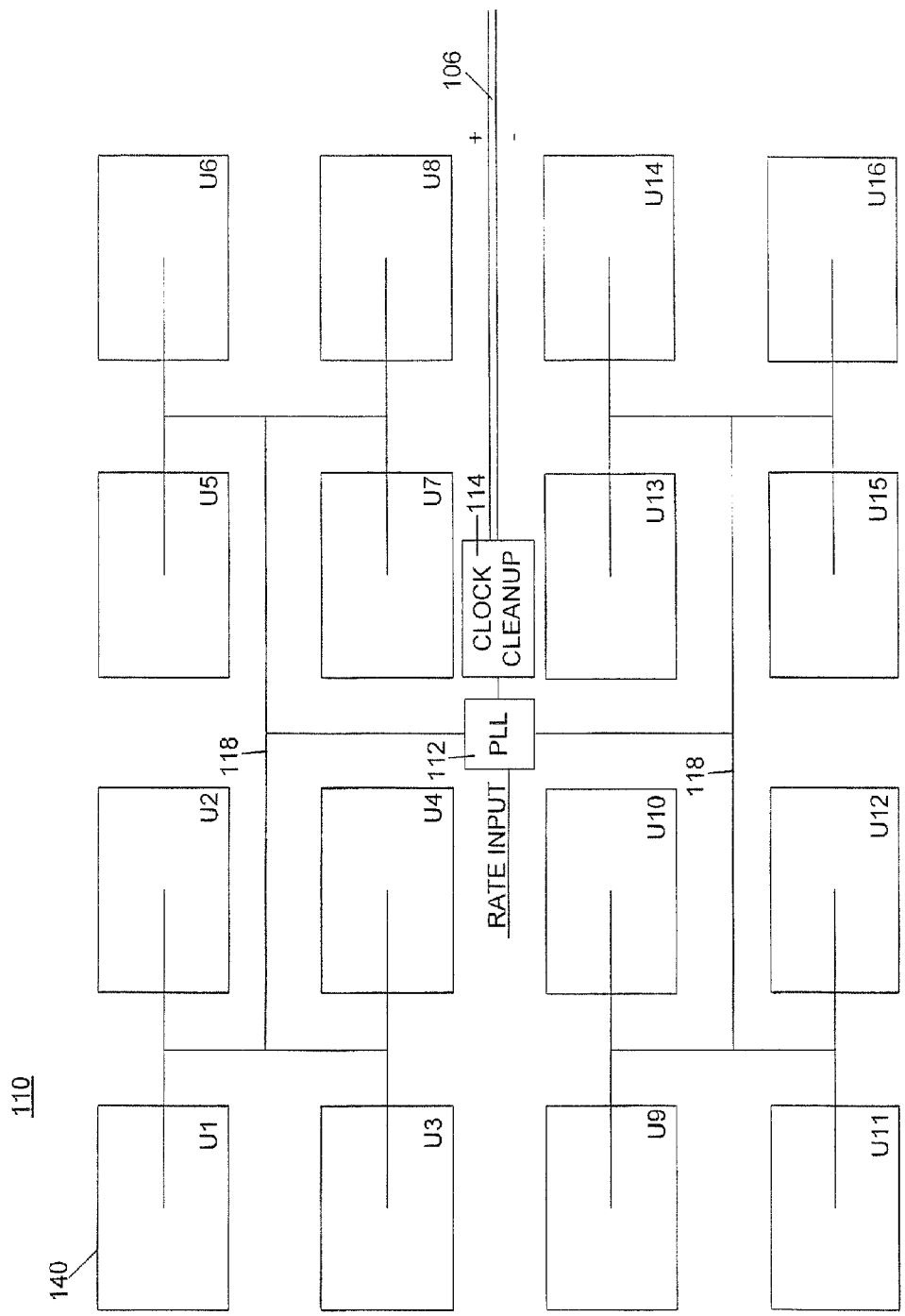
FIG. 4 is a block diagram illustrating clock distribution in a subset of a portion of the system illustrated in FIG. 3 according to embodiments of the invention.

FIG. 4 illustrates details of an example one of the blocks 110 illustrated in FIG. 3 that includes a number of functional units 140. A PLL 112 connects to the functional units 140. Sixteen units 140 are illustrated in FIG. 4 although any number of separate units could be implemented. The PLL 112 receives a clock signal from a clock cleanup circuit 114, which in turn receives the differential clock signal from the differential clock signal lines 106 (FIG. 3).

The clock cleanup circuit 114 generates a single clock signal from the clock differential signal as well as "polishes" and cleans up the generated clock signal, which, coming from an off-chip oscillator 102, may have very poor clock signal qualities. The clock cleanup circuit 114 may also contain a clock divider or multiplier to change the output frequency of the cleanup circuit 114 to a frequency that is different than the input frequency from the oscillator 102. Additionally, the clock cleanup circuit 114 may contain circuitry that makes a uniform output clock signal that approximates a square wave with 50% duty cycles and sharp rising and falling edges. Further, the power supply rejection ratio of the clock cleanup circuit 114 is relatively high, which ensures that all of the cleanup circuits throughout the entire integrated circuit 100 generate clock signals at the same time.

After the clock cleanup circuit 114 generates the clean clock signal, the PLL 112 generates a base clock signal that is used by all of the units 140 within a block 110. The base clock signal is distributed to the blocks 140 over a distribution line 118. As described above, the distribution line 118 may be in an "H" distribution pattern or other pattern. By distributing the base clock signal in the "H" pattern, as illustrated in FIG. 4, each unit 140 U1-U16 has an equal amount of clock delay from the PLL 112. In other words, because the length of the clock distribution line 118 is the same from the PLL 112 to each of the units 140, each of the units receives the base clock signal at the same time, irrespective of the actual distance between each unit and the PLL 112. Because of the relatively short distance of the distribution line 118, the distribution line may be a single clock line rather than the differential clock distribution line 106 of FIG. 3, and the distribution line 118 may or may not include buffering circuits.

In some embodiments, the PLL 112 includes a programmable clock multiplier that changes the frequency of the clock signal from the clock cleanup circuit by a predetermined amount. Then the PLL outputs a stable base clock signal for the particular block 110 in which the PLL sits. As illustrated in FIG. 3, there can be multiple blocks 110 in the integrated circuit 100, each having a separate PLL that can operate independently from any other PLL in the integrated circuit 100. In other embodiments, a single PLL may feed all of the blocks 110 throughout the integrated circuit 100. Although in the most general sense any of the programmable PLLs 112 can be programmed to generate a base clock signal having any pre-selected frequency, many embodiments will set the PLLs 112 in every block 110 to the same frequency to facilitate inter-unit and inter-block communication.

In an example embodiment, the PLL 112 accepts an input of a desired base clock rate for the block 110. The rate may be a particular static value set at manufacture or may be programmable over a data network (not shown). For example, the PLL 112 may accept a signal indicating that the PLL 112 should multiply the clean clock signal from the clock cleanup circuit 114 by a factor of 10-200, Thus, if the clock frequency from the clock cleanup circuit 114 is 10 MHz, the PLL 112 could be programmed or set to generate a base clock on the distribution line 118 of 100 MHz-2 GHz with 10 MHz increment precision. Of course, these are sample clock frequencies and precision and embodiments of the invention are not limited to these examples. As stated above, each unit 140, labeled U1-U16, can operate from a base clock signal from its PLL 112 that is different than all of the other functional units 140 in the integrated circuit 100, but it would be more typical for many or all of the units 140 to operate at the same frequency, that is, to program their PLLs 112 identically.

Figure 5:
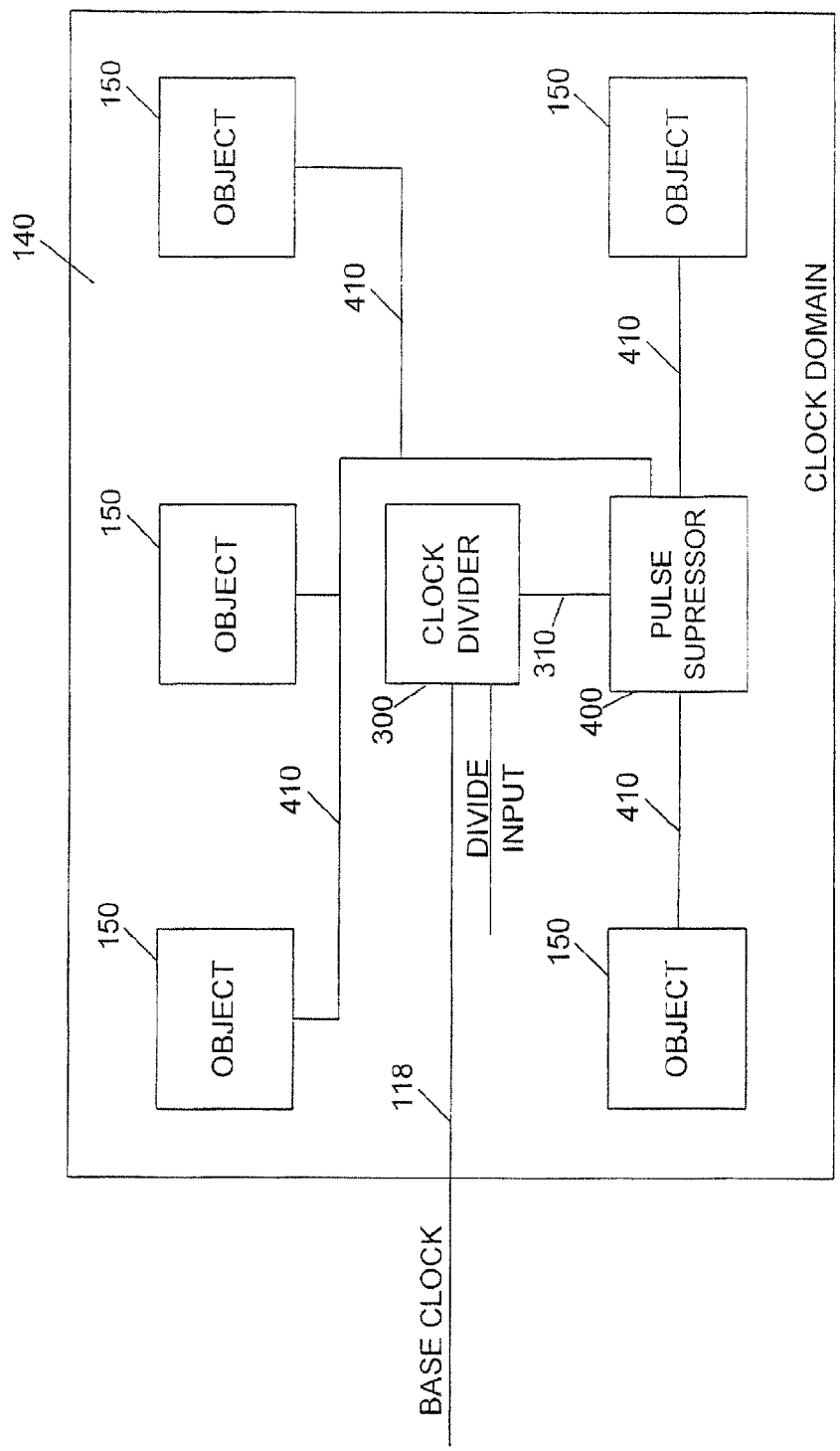
FIG. 5 is a block diagram illustrating an example clock domain according to embodiments of the invention.

FIG. 5 is a block diagram illustrating details of an example implementation of a unit 140. Of course, individual components of a unit 140 can vary and many more components may be present within a unit. In FIG. 5, the unit 140 receives the base clock signal over the clock distribution line 118 that was generated by the PLL 112 of the block 110 (FIG. 4). A clock divider circuit 300 is programmable to accept the base clock signal and a dividing factor. The clock divider 300 reduces the base clock signal by the factor received on its rate input and outputs a slower clock signal on a master signal line 310. The clock divider circuit 300 is discussed in detail below. The master clock signal from the output line 310 is fed to a pulse suppressor circuit 400. The pulse suppressor circuit 400 masks a pre-selected number of the slowed clock signals that it receives from the clock divider 300 to produce a new clock signal (the "unit" clock) that is distributed to various objects 150 within the unit 140. Examples of a pulse suppressor circuit 410 are illustrated below. The objects 150 illustrated in FIG. 5 can be any type of circuit that uses a clock signal, such as computer processors, Arithmetic Logic Units (ALUs), memory circuits, or any other type of circuit. Further, the objects 150 may be embodied by hardware objects such as those described in the '329 U.S. patent application listed above.

FIGS. 6A and 6B illustrate the function of an example clock divider circuit 300. In this example, the clock divider 300 divides the base clock signal accepted from an input line 118 by a factor of $2^n$ where n is an integer number. In one example, n can be a number between 1 and 8, inclusive and therefore the base clock signal can be slowed between 2 and 256 times. For instance, if the base clock signal is 800 MHz, the slowed clock on the line 310 could be 400 MHz (divided by 2), 200 MHz (divided by 4), 100 MHz (divided by 8), and so on with the slowest clock frequency as 3.125 MHz (divided by 256). FIG. 6B illustrates sample outputs for particular values of n.

For example, assume that the original base clock signal has a period of two seconds and a 50% duty cycle. Therefore, the original base clock cycle has a HIGH signal for one second and a LOW signal the following second. The next line in the timing diagram 6B illustrates the output from the clock divider 300 where the original clock signal is divided by $2^1$, or 2. Because it is divided by 2, this divided clock signal has a period twice as long as the original signal, thus it has 2 seconds of a HIGH signal followed by 2 seconds of a LOW signal. Note that this is exactly twice the length and duration of the clock cycle of the original base clock signal, and thus ½ the frequency. Also note that every rising edge of the clock signal divided by 2 has a corresponding rising edge aligned with the rising edge of the original clock signal. In fact, because of the binary progression of the clock divider 300, every rising edge of every slowed clock signal output by the divider 300 is edge aligned to a rising edge of the original clock signal. Further, between any pairs of clocks generated by the clock divider 300, the rising edge of the slower clock always aligns with a rising edge of the faster clock.

With reference back to FIGS. 4 and 5, each unit 140 can include its own separate clock divider circuit 300. Because the electrical load characteristics are close to identical for all of the clock distribution lines 106 carrying the original clock signal from the oscillator 102 to all of the blocks 110, the clock signal from the PLL 112 of each block 110 also reaches each unit 140 at approximately the same time. Therefore, any rising edge of the original clock signal synchronizes across all of the units 140 within a block 110. Furthermore, the rising edge of any clock signal in any particular block 110 should approximately match a corresponding rising edge of a clock signal in any other block 110 throughout the integrated circuit 100. Thus, the rising edge of any clock within any of the units 140 of any block 110 are always aligned to a rising edge of every faster clock within the entire integrated circuit 100.

Figure 7A:
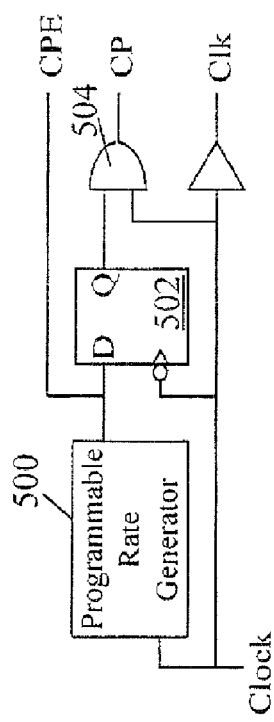
FIGS. 7A and 7B are related block and timing diagrams illustrating an example clock pulse suppression system according to embodiments of the invention.
Figure 7B:
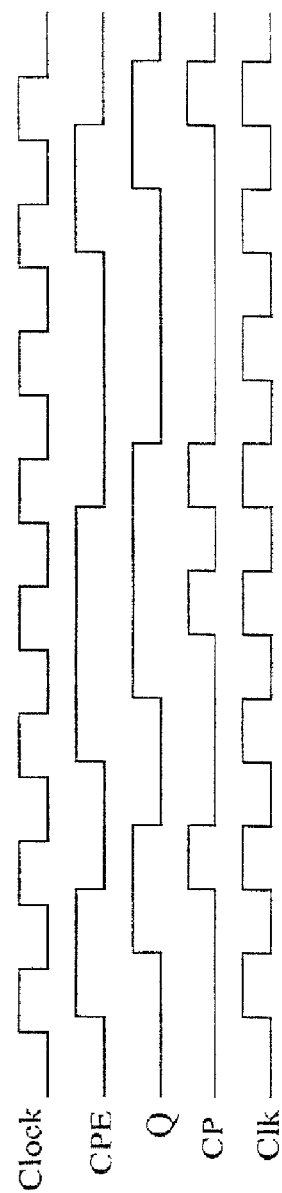

FIGS. 7A and 7B are respective block and timing diagrams of an example clock suppression circuit. The main clock "Clock" is used by a programmable rate generator 500 to create a clock pulse enable signal CPE. The CPE signal is then re-timed through a flip-flop 502 so that it can be combined with the original Clock in an AND gate 504 to create a new clock CP. Referring back to FIG. 5, the new clock CP is a signal that could be routed as the unit clock over a clock distribution line 410 through the unit 140 for the objects 150 to use as their clock. In FIG. 7B note that the clock signal CP is in phase and synchronous to the copy of Clock, "Clk," but the clock signal CP has some clock pulses removed. This means that, over time CP has a different rate that the Clock signal "Clock", and thus effectively CP runs at a different frequency than Clock.

As illustrated in FIG. 7B, the assertion of the enable signal CPE indicates that the next Clk pulse will be present on the signal CP. The rising edge of CPE is delayed relative to the rising edge of Clk, which can prevent race conditions when they are both being evaluated.

The clock rate for the objects 150 within a unit 140 is determined by providing a fraction that specifies the desired number of pulses from the clock divider 300 (FIG. 5) to be passed as the unit clock compared to the total number of total pulses from the clock divider that define a clock "group." In this disclosure the letter "m" indicates the numerator and "n" indicates the denominator of such a fraction. Thus, the clock pulse signal CP is generated by the following equation:

$$CP = (m/n) \times Clk$$

In some embodiments, the programmable rate generator 500 spreads the m pulses across the n cycles of a clock group in the most even manner. In some embodiments the rate generator can use three inputs: gap, extend and length, given by the equations:

$$\text{gap} = \left\lfloor \frac{n-m}{m} \right\rfloor$$

$$\text{extend} = m(\text{gap} + 1)$$

$$\text{length} = n - 1$$

The gap calculation indicates how many LOW pulses follow a single HIGH pulse in the derived clock. The HIGH pulse followed by "gap" number of LOW pulses is then repeated until the count either hits extend or length. When the count is length, the next count is set to zero and the sequence repeated with a subsequent clock group. The extend input indicates the point at which all subsequent pulses in the clock group are set LOW.

Figure 8:
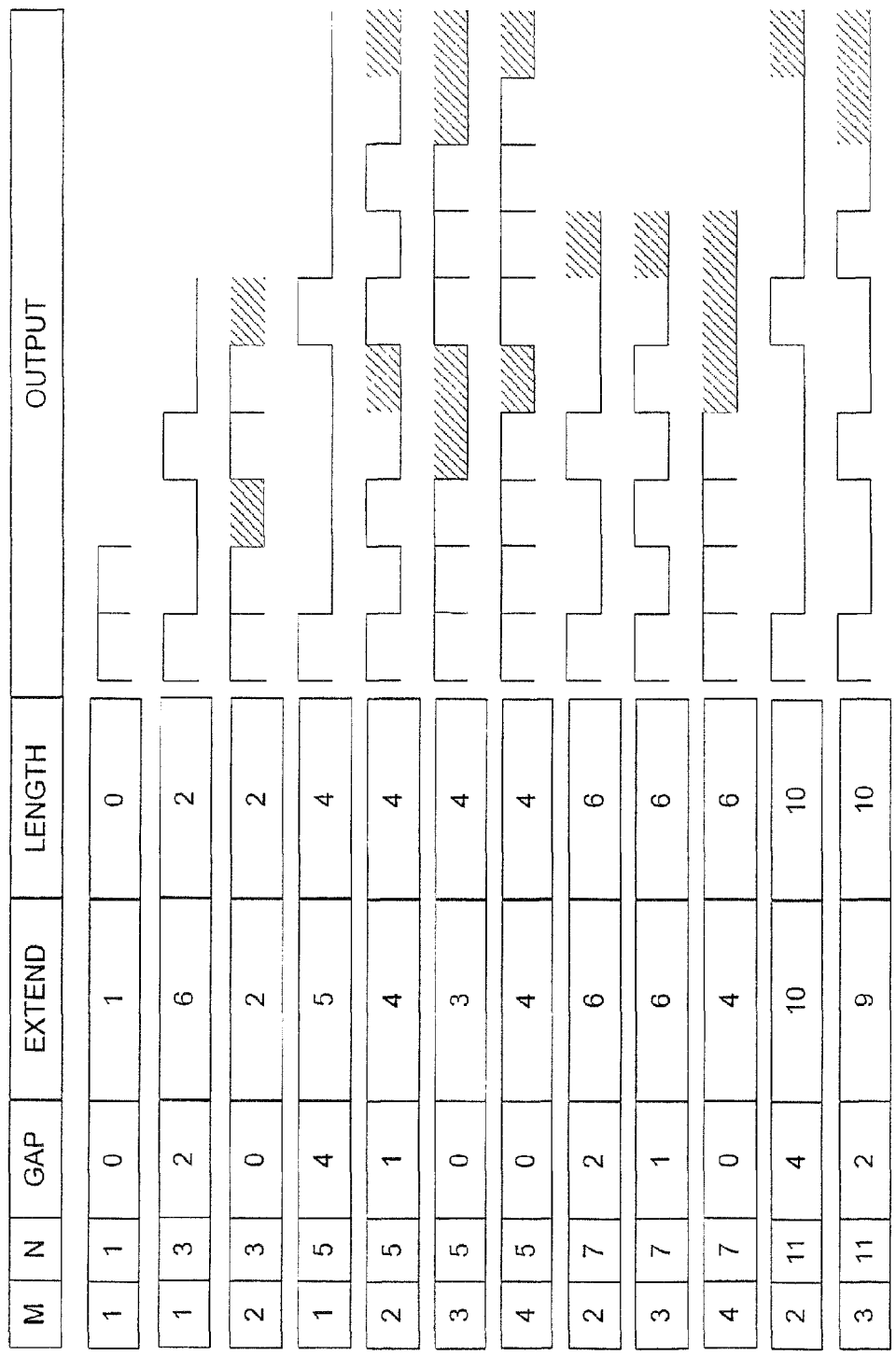
FIG. 8 is a table illustrating sample clock pulse suppression ratios.

FIG. 8 illustrates a table of common examples. The shaded cycles show where the sequence has been extended. In FIG. 8 the illustrated output is the enable signal that enables an underlying clock pulse. Thus, when the enable signal is positive, the underlying clock pulse becomes the output clock pulse, and when the enable signal is negative, no clock pulse will be passed.

Figure 9:
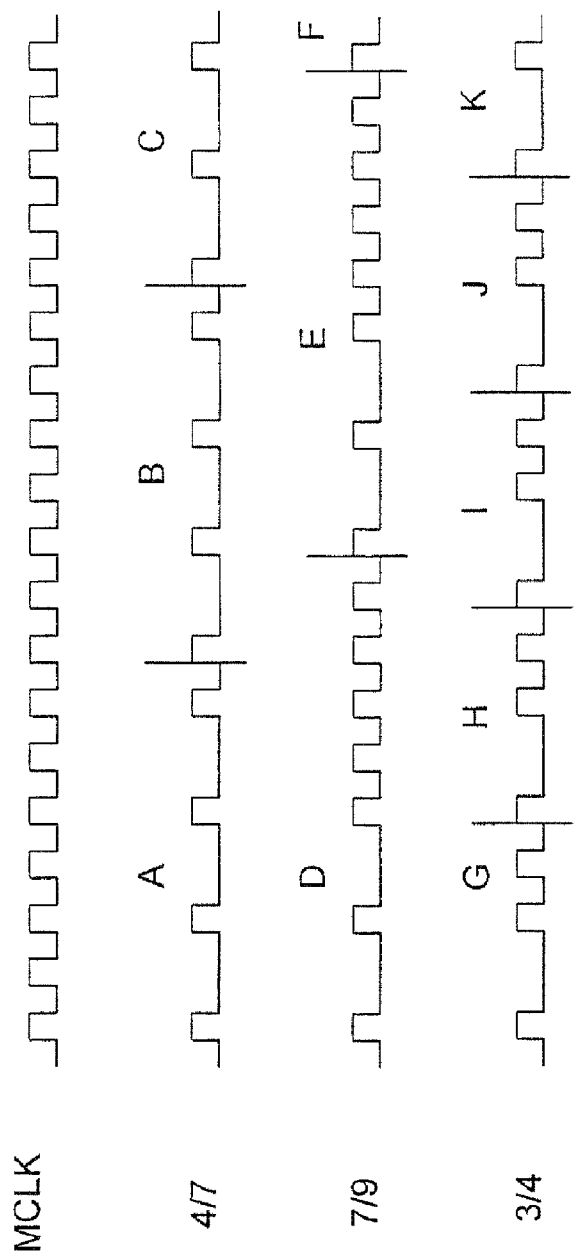
FIG. 9 is a clock timing diagram illustrating sample clock pulse suppression fractions.

The output of the rate generator can maximize the minimum distance between positive edges, thus allowing the maximum combinational logic depth for each ratio. When there are more than one extended low, the extra lows could be distributed within the cycle, but the minimum distance cannot be increased. Examples of maximally spreading out the clock pulses within a clock group are illustrated in FIG. 9, with an underlying base clock illustrated as MCLK, and three different examples of clock pulse CP outputs. In the first example the group of clock pulses includes 7 pulses, and 4 of the pulses are passed as CP during that clock group. In the second example, 7 of 9 pulses of MCLK are passed as CP, and the third example passes 3 of 4 MCLK pulses as CP.

Referring to the first example, each clock group includes 7 cycles, labeled A-C. One way to maximize the spaces throughout a group of pulses is to always output a space following an output pulse, repeating until all of the following pulses within a clock group must be asserted to reach the desired clock output. In the first example of FIG. 9, the desired clock rate is 4 of 7 clocks per group. Therefore, in clock group "A", the first pulse of MCLK is passed as the output, followed by a space. This pattern is repeated 3 times, and then the final clock pulse of MCLK is generated to complete clock group "A." The last pulse of clock group "A" is adjacent to the first pulse of clock group "B." The second example includes even more clock pulse adjacencies. In the clock group "D," 7 of 9 pulses are desired to be asserted, and thus only 2 clock pulses from each group are suppressed. According to the "pulse followed by suppress" pattern, the first pulse/suppress pair is followed by a second pulse/suppress pair. At this stage of clock group D, there are 5 clock MCLK pulses remaining and 5 more CP pulses need to be generated to fulfill the example 7 of 9 ratio, so each subsequent MCLK pulse is passed as the CP pulse until the clock group D is completed. Clock groups E and F (not completely shown) follow in the same pattern. The third example includes 3 of 4 MCLK pulses asserted in each clock group G-K, and follows the above patterns as well. In the 3 of 4 example, a first pulse is followed by a first suppression, then the remaining MCLK pulses are passed until 3 pulses have been passed in every 4 MCLK cycles.

In each of these examples in FIG. 9, (4/7, 7/8, and 3/4) m/n is always greater than 0.5, which can be desirable for some applications. Because of the binary nature of the clock divide circuit 300 of FIG. 5, an example system provides that m/n is always greater than 0.5. For instance, if originally 3 out of 10 pulses of a 100 MHz clock were desired, (30 MHz, which would give a fraction of 3/10), the 100 MHz clock could be divided by a further factor of 2 into a 50 MHz clock and the fraction specified as 6/10—also giving a 30 MHz clock). Using fractions always greater than 0.5 ensures that the output CP will have more pulses than gaps, which is desirable in some logic designs.

Figure 10:
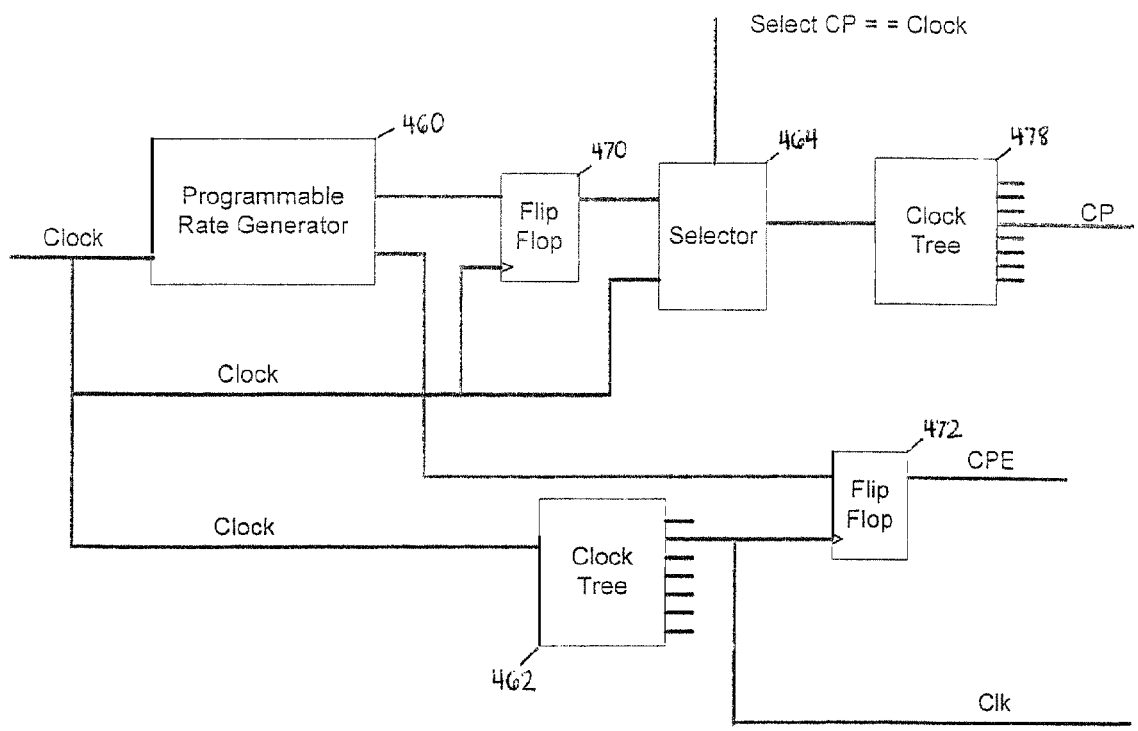
FIG. 10 is a block diagram of a clock pulse suppression system according to embodiments of the invention.

FIG. 10 illustrates a clock suppression and generation circuit 450 that can generate clock signals according to embodiments of the invention. The generation circuit 450 generates signals similar to those generated in FIG. 7A. In this circuit 450, a Clock signal "Clock" from the PLL or other clock signal generator is used to create various clock signals CP, CPE, and Clk. Specifically, a programmable rate generator 460 accepts the Clock signal and generates a pair of outputs. The Clock signal is also routed to a clock tree 462 and to a selector 464, such as a multiplexer. The output of the clock tree 462 is the Clk signal, which is identical to the Clock signal except for the delay in passing through the clock tree 462. The outputs of the rate generator 460 are fed to two re-timing flops 470 and 472.

In operation, the selector 464 accepts a selection signal. The selection signal determines which signal will be used as the CP output—either a signal from the rate generator 460 or the original Clock signal. If the Clock is selected to be the base for the CP signal, the original Clock signal is provided to a clock tree 478 for distribution as CP. Otherwise, CP is derived from the output tof the rate generator 460, and will have a slower rate than the original "Clock" signal.

The rate generator 460 may be embodied by stand-alone hardware or by a suitably programmed device. In either case, the rate generator 460 may include a divider circuit such as that described in FIG. 6A combined with a pulse suppression circuit that operates to generate particular clock patterns of any frequency, as described in FIGS. 8 and 9. Further, the pulse suppression circuit may be configured to operate as described in FIGS. 11A-11B below. More specifically, the pulse suppression circuit can include counting circuits and reset circuits connected through simple combinational logic.

The rate generator 460 also creates an enable signal that is routed to the re-timing flop 472. The flop 472 accepts the Clk signal as its clock signal. This ensures that the CPE signal that is output from the re-timing flop 472 has a rising edge that is offset slightly from the Ck signal, which prevents race conditions if the CPE signal is ever sampled at a transition of the Clk signal.

Figure 11A:
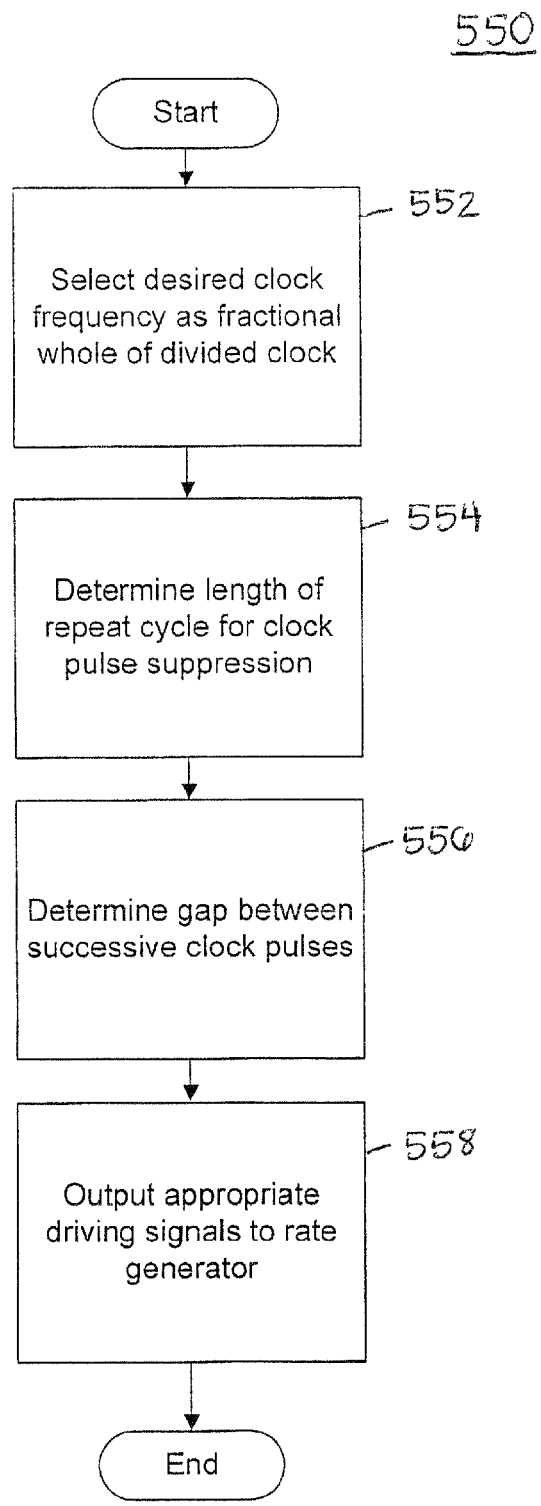
FIGS. 11A and 11B are example flow diagrams illustrating implementations of generating clock pulse suppression signals.
Figure 11B:
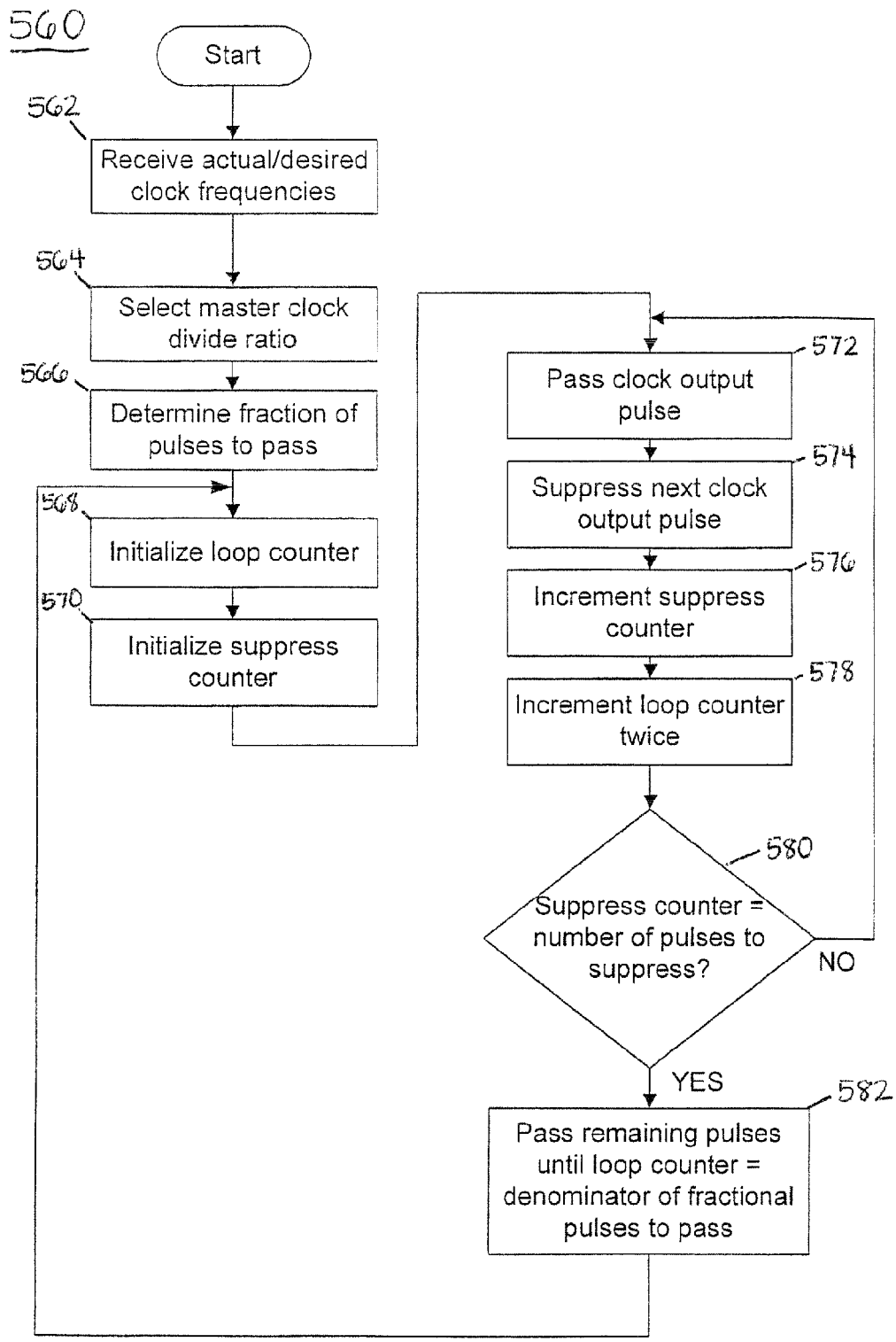

FIGS. 11A and 11B are example flow diagrams illustrating how the rate generator of the pulse suppressor 400 (FIG. 5) or programmable rate generator 460 (FIG. 10) can be driven. The flow of FIG. 11A is a straightforward overview, while the flow in FIG. 11B is more detailed.

In FIG. 11A, a general flow 550 includes first selecting a desired clock frequency as a factional whole of a divided clock in procedure 552. For example, if an incoming clock signal is 300 MHz, and it is desired to drive a particular block of the circuit at 50 MHz, the main clock can be divided by $2^2$, or 4, which yields a 75 MHz base. Next, in a procedure 554, the size of a group of clock cycles to repeat with some pulses suppressed is chosen. In the above example, a group of clock cycles can be "3". Procedure 556 instructs to determine the gap between successive clock pulses. For the above example the first pulse of the group can be passed, the second pulse suppressed, and the third pulse also passed. That passes 2/3 of a 75 MHz clock, which gives an effective 50 MHz signal. The rate generator can then output these appropriate signals using the techniques described above in a procedure 558.

FIG. 11B illustrates a flow 560 including more detailed procedures of how to operate the rate generator. Some of the procedures are similar to those in 11A, such as receiving the actual and desired clock frequencies in procedure 562. For this example, assume a 400 MHz actual clock and a 65 MHz desired clock output. A master divide ratio is determined in procedure 564, which in this example is 4 bringing the clock speed out of the clock divider to 100 MHz. Procedure 566 determines how many pulses to pass within a pulse group, which in this case is passing 13 pulses (thus suppressing 7) out of a 20 pulse group. Counters are initialized in procedures 568 and 570. The first pulse of the group is passed in the procedure 572, followed by a suppressed pulse in procedure 574, and the suppress counter is incremented in procedure 576. The loop counter is incremented twice in procedure 578, once for the passed pulse, and once for the suppressed pulse. In procedure 580, a check determines whether enough pulses have been suppressed in the current group to make the desired frequency. Thus, in this example, the procedures 572-578 will be performed 7 times. When the flow 560 exits procedure 580 in the "Yes" direction, the loop counter will equal 14. Seven pulses will have been passed, and 7 pulses will have been suppressed. The flow 560 then proceeds to procedure 582, where the remaining pulses in the current group are passed. Additionally each passed pulse increments the loop counter. In the above example, an additional 6 pulses will be passed, bringing the loop counter to 20, and the total passed pulses is 13 in the group of 20. Since this example started with a 100 MHz clock, the output of the example pulse-suppressed system is 65 MHz. The flow 560 then loops back to the procedure 568 and the process of generating the desired frequency output continues. In other embodiments, such as a system having a dynamically reconfigurable clock, the flow 560 loops to before the procedure 562, and a new pulse suppression formula is determined. Configuration or dynamic configuration can be performed by writing appropriate data to a memory location and/or by generating appropriate signals for driving the clock divider and pulse suppression processes. Although this flow 562 illustrates a system that counts pulse suppressions, the flow can easily be modified to count the number of passed pulses in the group. Further, although it may be desirable to always pass greater than 50% of the pulses within a group, the method works equally well to pass less than 50%. This may be necessary, for instance, if the clock divide procedure that is available lacks adequate precision.

Figure 12:
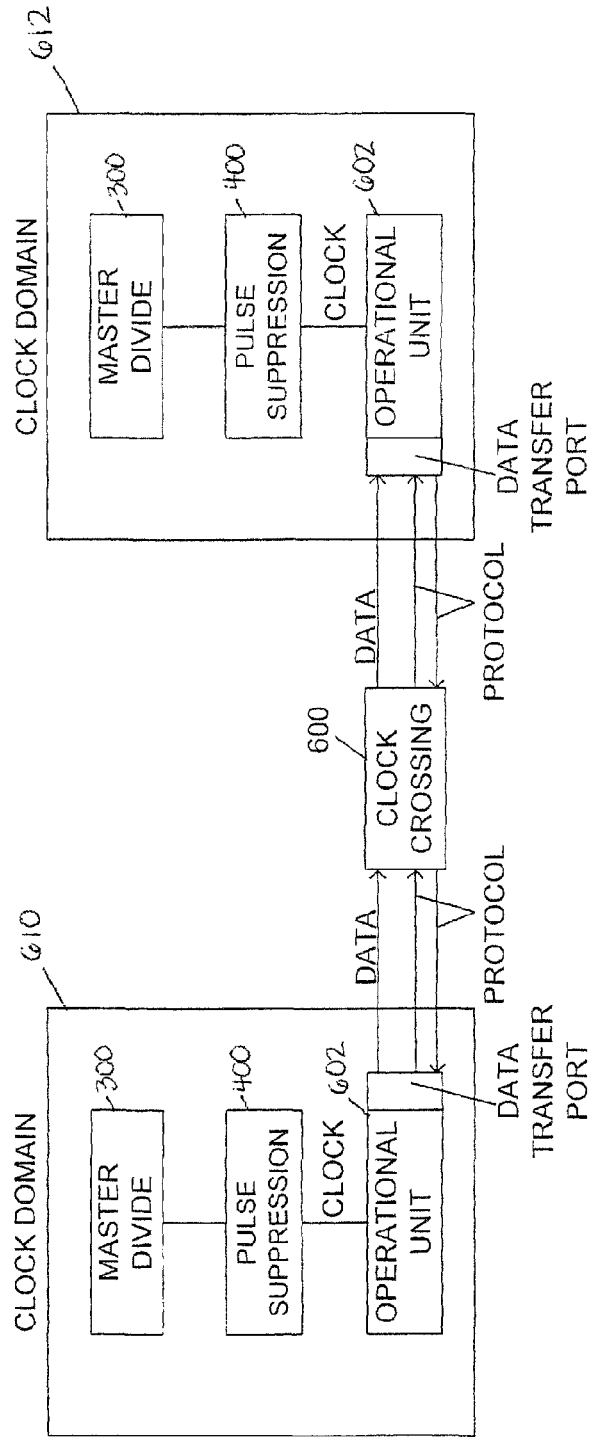
FIG. 12 is a block diagram illustrating two clock domains sending data between them according to some embodiments of the invention.

FIG. 12 is a block diagram illustrating how a clock domain transfers data to another domain even when the clock domains are running at different clock rates. As described above, in some embodiments each clock domain includes its own master divide circuit 300 and pulse suppression circuit 400 that are tied to an operational unit 602, such as one having a data transfer port. Data is passed from the first clock domain 610 to a clock crossing circuit 600, which re-times the data for use in the second clock domain 612. Protocol communication also connects the first and second domains to the clock crossing circuit 600. Example of the communication protocol and structures are discussed in the above-reference '347 patent application. Basic two-wire interface registers can be configured to run at different rates by using a synchronous clock and differing clock enables. Using embodiments of the invention, hundreds, thousands, or tens of thousands of different clock domains may be present on a single integrated circuit.

Figure 13:
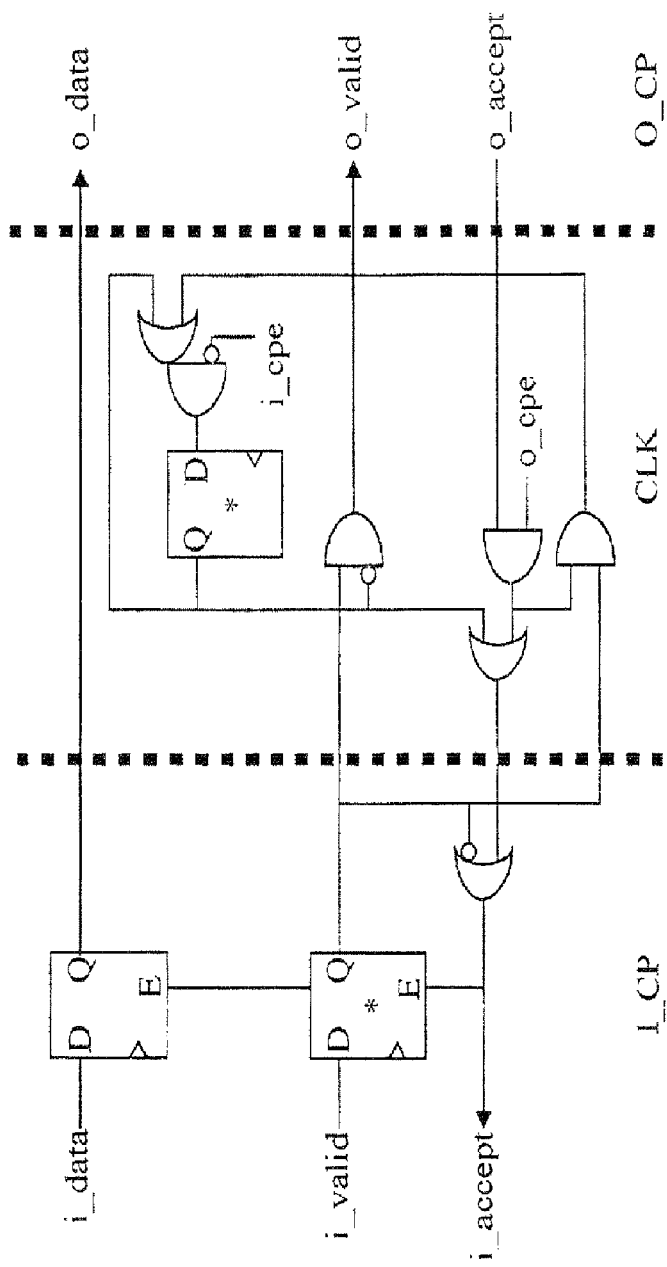
FIG. 13 is a schematic diagram illustrating a simple two-wire register including logic used to clock the clock crossing data input interface between two clock domains according to embodiments of the invention.
Figure 14:
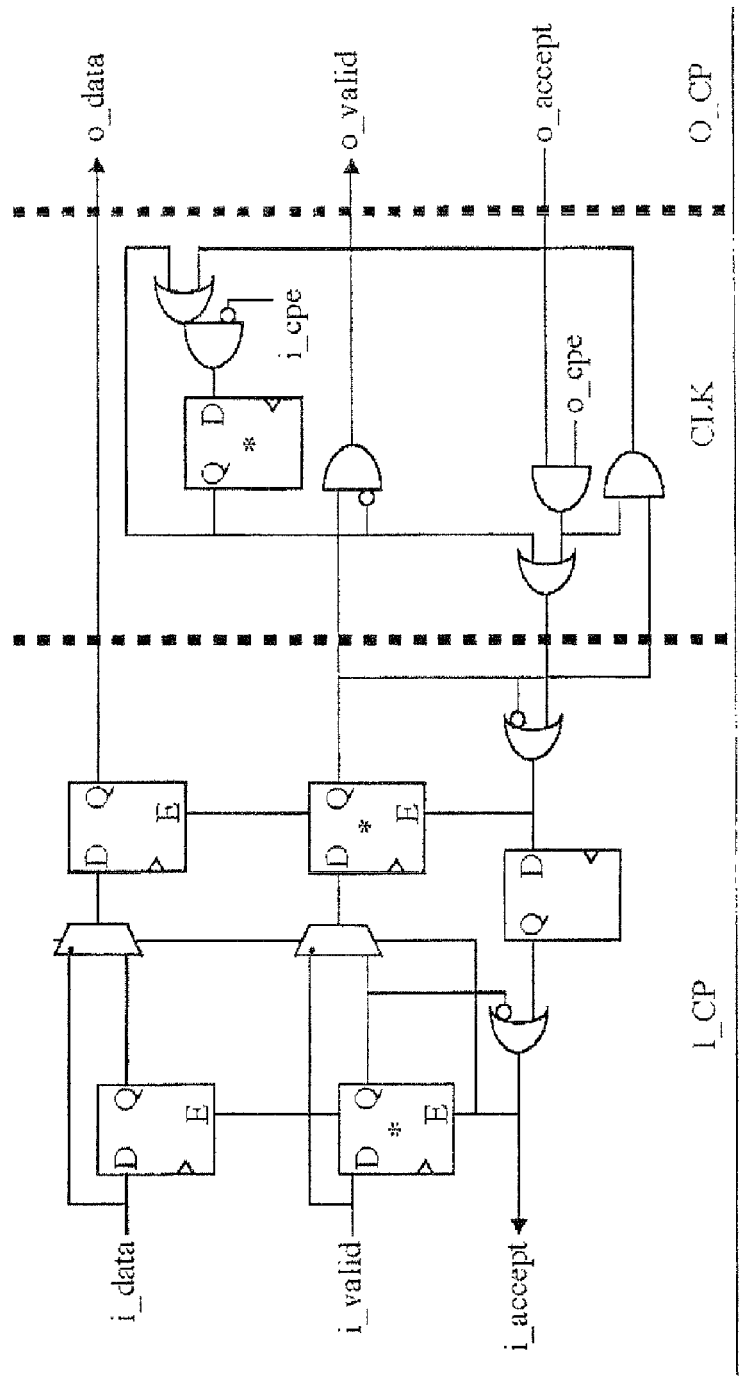
FIG. 14 is a schematic diagram of another clock crossing interface according to other embodiments of the invention.

FIG. 13 is a schematic diagram that illustrates a simple two-wire register including logic used to clock an input interface using i_CP and an output interface using o_CP. In this diagram, i_CP refers to the clock signal of the input clock domain while o_CP refers to the clock signal of the output clock domain. Either or both i_CP and o_CP can be generated using the techniques discussed above. Note that the signal o_Cp is not used. It is interesting to note that the logic behaves identically to a standard register if the enables were to be permanently asserted, and that the "cost" compared to a standard register is one gate delay in each of o_valid and o_accept. Further, if the clock suppressions of i_CP and o_CP are identical, the register illustrated in FIG. 13 behaves exactly as if the two domains are completely synchronous without any extra cycle slips. FIG. 14 shows that the same logic can be applied to a full two-wire register where the accept is re-timed.

The concept of using valid and accept protocols to allow the receiving and sending processes to slip cycles independently is tied to the function the two-wire interface, and allows each process to clock at different rates. A potential restriction is that each of i_CP and o_CP are derived from a common clock, denoted CLK in the examples given in FIG. 13 and FIG. 14. To be precise, for any two desired frequencies, i_CP and o_CP, the frequency of the common clock CLK is the highest frequency (or higher) of the two clocks.

This in itself is not very restrictive when the frequencies of i_CP and o_CP are reasonably close to each other: a frequency pair (20, 30) would have a common frequency of 30 MHz, with m=2 and n=3 to generate the lower frequency and m=1, n=1 to generate the upper frequency, for example. A more extreme example is when the frequency pair is (6,817): the common frequency would be 817 MHz with m=6 and n=817. The second example shows the potential risks: first both circuits must be capable of running at 817 MHz worst-case because there is no guarantee that the 6 MHz clock doesn't have adjacent pulses; secondly that the clock divider needs a large number of bits in order to generate the correct frequency.

If we now extend this concept to an integrated circuit of multiple different clock regions, there would be one master clock CLK in common for all nsub-clocks. Naturally the frequency of CLK is given by:

$$CLK=\max(CP1,CP2,\ldots,CPn)$$

In this case the fact that all regions must be capable of running at the CLK frequency is exacerbated in that it is clearly very challenging to the designer if for example CP1=2 MHz, CP2=3 MHz and CLK=1.024 GHz. In such a case a 1.024 GHz clock is used to transfer data between a 2 MHz and 3 MHz region, and both regions must be capable of running at 1 GHz.

Fractional clocks minimize this and other issues. In embodiments of the invention, one set of master clocks is used instead of a single, fastest master. The set is derived from the fastest master by dividing by 2 each time. As described above, using a binary relation ensures that all positive edges are aligned between any pair in the set, and that the enables relating the master clks are easy to both infer and generate.

Now each clock region in the ensemble can independently select the most appropriate master CLK from the set. If we use the previous example of CP1=2 MHz, CP2=3 MHz and CLK=1.024 GHz, we can use the $2^9$ (512) and $2^8$ (256) divide for the masters for CPM1=2 MHz and CPM2=4 MHz—far simpler to distribute and a much easier design target for each of the units. Another side-effect of using lower frequency masters is that the clock divider 300 requires fewer bits for m/n to achieve near the desired frequency.

This also allows different clock domains in the integrated circuit 100 to use different design targets and simply declare the maximum frequency it can run. This only limits the choice of master clocks for that region, not the maximum speed of the entire circuit. Similarly, the frequency of the fastest CLK in the master set can be adjusted to suit the application by scaling the whole master set.

Figure 15:
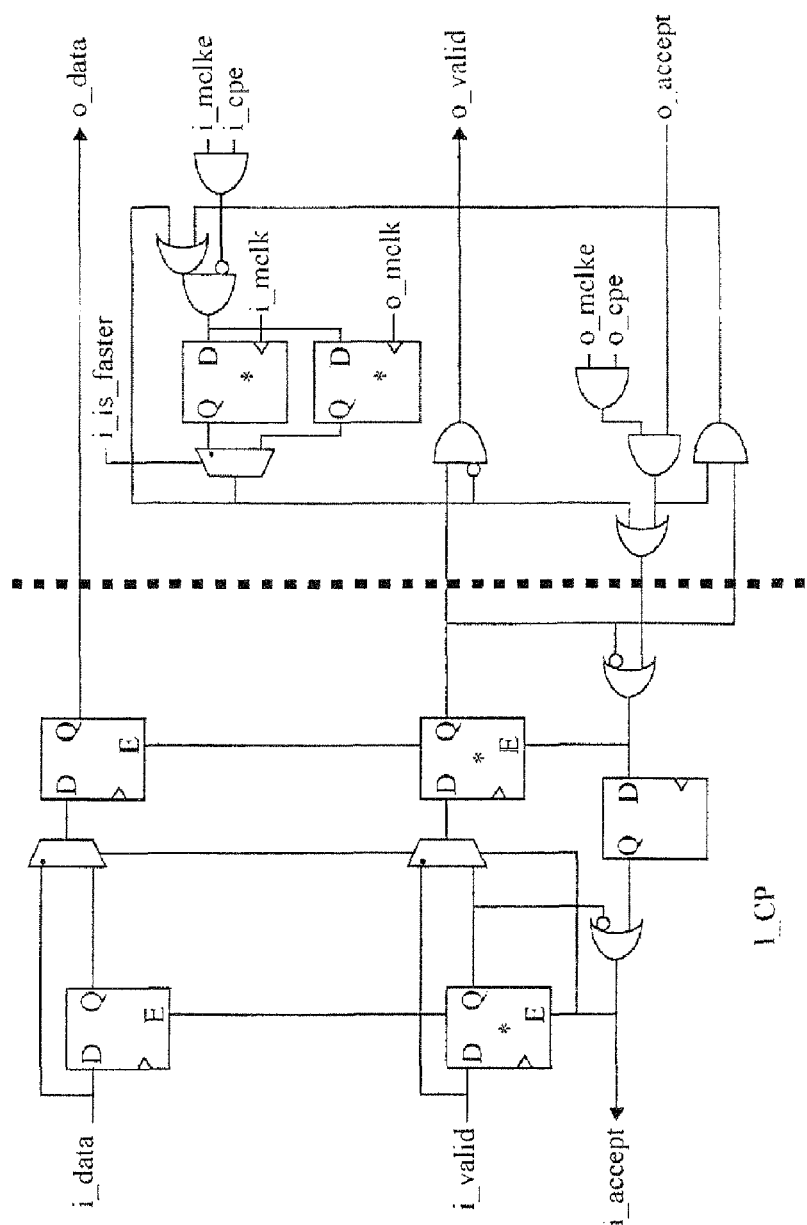
FIG. 15 is a schematic diagram illustrating an implementation of the fractional clock scheme according to embodiments of the invention.

FIG. 15 shows the basic implementation of the fractional clock scheme. Two master clks, i_mclk and o_mclk are used to derive i_CP and o_CP respectively using separate m/n dividers which generate the appropriate i_cpe and o_cpe enables. The signal "i_is_faster," when asserted, signifies that the i domain is faster than the o domain. Such a signal can be statically selected or can be determined while the domains are operating. Note that because of the binary $2^p$ relationships between the master clocks, the system can always be configured such that m/n>0.5.

Figure 16A:
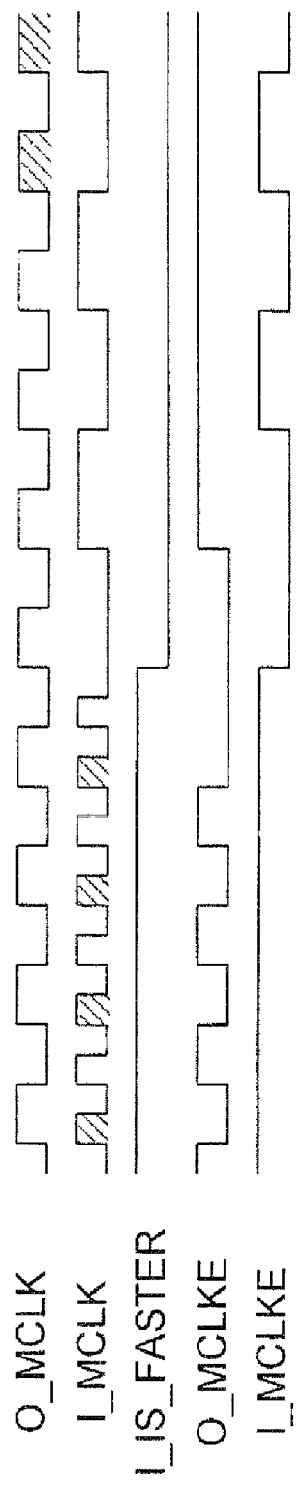
FIGS. 16A and 16B are timing diagrams that illustrate how various master clocks and other signals are related according to embodiments of the invention.
Figure 16B:
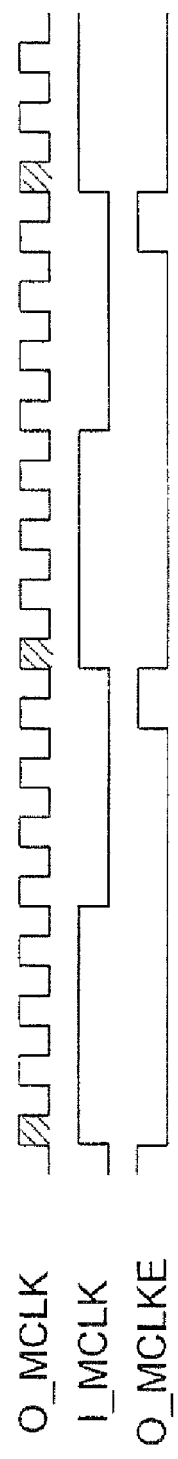

FIGS. 16A and 16B show various master clocks and the relationships between them. In FIG. 16A, the input master clock, i_mclk, transitions after eight pulses to become slower. Any behavior during the transition may have an undefined state. The shaded clocks indicate the first pulse of the faster clock after each slow clock pulse. These figures illustrate the relationships between the enables and master clocks. The shaded pulses indicate a master clock pulse where a transfer could occur, i.e. where the clock pair has a co-incident rising edge. The enables indicate which pulses are the shaded pulses. FIG. 16B illustrates the case where the master clocks are very different in frequency. In this example, i_is_faster is always LOW and i_mclke is always HIGH.

In application, if it is known that the CLK signal of FIG. 13 or 14 (driving the flop) is guaranteed to be as fast or faster than the clock signal driving the I_CP and O_CP domains, a circuit such as that illustrated in FIG. 13 or 14 can be used. When no such clock relation is guaranteed, a circuit such as that illustrated in FIG. 15 can be used.

A tangible advantage of using a protocol, such as the 2-wire protocol, to throttle data-flow according to the separate input and output clocks is that the large data buffers typically found between clock domains can be eliminated. In effect, each of the previously necessary large data buffers is replaced by a single crossing register, which is throttled by clock ratio.

Although particular embodiments for a clock suppression and data exchange across multiple clock domains has been discussed, it is not intended that such specific references be considered limitations on the scope of this invention, but rather the scope is determined by the following claims and their equivalents.

What is claimed is:

1. An integrated system comprising:
 a master clock signal;
 in a first clock domain:
  a first divided clock signal generated from the master clock signal, the first divided clock signal having rising clock edges, and
  a first clock suppression circuit structured to generate a first suppressed clock signal from the first divided clock signal, each of the rising clock edges of the first suppressed clock signal aligned with one of the rising edges of the first divided clock signal;

in a second clock domain:
a second divided clock signal generated from the master clock signal, the second divided clock signal having rising clock edges, and a second clock suppression circuit structured to generate a second suppressed clock signal independent of information about the first clock suppression circuit, each of the rising clock edges of the second suppressed clock signal aligned with one of the rising edges of the second divided clock signal; and a clock crossing domain between the first clock domain and the second clock domain, the clock crossing domain accepting a clock crossing signal that is as fast or faster than the fastest of the first divided clock signal and the second divided clock signal, and the clock crossing domain requiring no buffering of data.

2. An integrated system according to claim 1 in which the clock crossing signal is the master clock signal.

3. An integrated system according to claim 1 in which the clock crossing domain comprises:
a first protocol communication line;
a second protocol communication line; and
a storage register for storing a data transfer signal, the storage register structured to accept the clock crossing signal at a clock input.

4. An integrated system according to claim 3, further comprising data the transfer of which is controlled by information on the first protocol communication line and the second protocol information line.

5. An integrated system according to claim 1 in which the first suppressed clock signal has a clock rate at least 50% of a clock rate of the first divided clock signal.

6. A method of passing data between two clock domains of a single circuit, comprising:
generating a first domain clock signal by suppressing clock pulses from a first clock signal while simultaneously aligning rising clock edges of the first domain clock signal to rising edges of the first clock signal;
generating a second domain clock signal independent from the first domain clock signal by suppressing clock pulses from a second clock signal while simultaneously aligning rising clock edges of the second domain clock signal to rising edges of the second clock signal;
driving a clock crossing circuit coupled between the first domain and the second domain at a clock rate that equals the faster of the first clock signal and the second clock signal to cause the data to be passed between the two clock domains without introducing any intervening data transfer latencies;
generating a transfer protocol signal from a combination of a first data transfer protocol signal and a second data transfer protocol signal; and
storing a state of the transfer protocol signal.

7. A method of passing data according to claim 6, further comprising generating the first clock signal by dividing a master clock signal by a binary clock divider.

8. A method of passing data according to claim 6 in which the first data transfer protocol signal originates from the first clock domain and in which the second data transfer protocol signal originates from the second clock domain.

9. A method of passing data according to claim 6, further comprising storing in a configuration register an value representing how many clock pulses of the first clock signal to suppress.

10. A method of passing data between two clock domains of a single circuit, comprising:
generating a first domain clock signal by suppressing clock pulses from a first clock signal while simultaneously aligning rising clock edges of the first domain clock signal to rising edges of the first clock signal;
generating a second domain clock signal independent from the first domain clock signal by suppressing clock pulses from a second clock signal while simultaneously aligning rising clock edges of the second domain clock signal to rising edges of the second clock signal;
driving a clock crossing circuit coupled between the first domain and the second domain at a clock rate that exceeds the first clock signal and the second clock signal to cause the data to be passed between the two clock domains without introducing any intervening data transfer latencies;
generating a transfer protocol signal from a combination of a first data transfer protocol signal and a second data transfer protocol signal; and
storing a state of the transfer protocol signal.

* * * * *